United States Patent [19]
Schulkind et al.

[11] 3,798,431
[45] Mar. 19, 1974

[54] ELECTRONIC CALIBRATION OF AN ELECTRO-MECHANICAL SYSTEM

[75] Inventors: Herbert Schulkind, Natick; Aage Pettersen, North Reading, both of Mass.

[73] Assignee: Corning Glass Works, Corning, N.Y.

[22] Filed: Oct. 4, 1972

[21] Appl. No.: 294,896

[52] U.S. Cl. ...... 235/151.12, 23/253 R, 204/195 T, 235/92 FL, 324/130
[51] Int. Cl. ............................................ G06f 15/46
[58] Field of Search..... 235/151.12, 151.35, 151.31, 235/151.13, 196, 92 CP, 92 MT, 92 FL, 92 QC, 92 DM; 23/230 R, 230 A, 253 R, 253 A, 253 TP, 254 E, 232 E, 255 E, 259, 292; 204/195 T; 324/30 R, 99 D, 140 R, 140 D, 71 R, 74, 130

[56] References Cited
UNITED STATES PATENTS

| | | |
|---|---|---|
| 3,665,305 | 5/1972 | Petrohilos .......................... 324/99 D |
| 3,649,205 | 3/1972 | Shirikawa et al. ............ 204/195 T X |
| 3,681,577 | 8/1972 | Gasiunas .................. 235/151.13 X |
| 3,711,774 | 1/1973 | Bohler .............................. 324/74 X |
| 3,713,774 | 1/1973 | Southwick .......................... 23/253 R |

Primary Examiner—Joseph F. Ruggiero
Attorney, Agent, or Firm—Walter S. Zebrowski

[57] ABSTRACT

An automatic correction is provided for mechanical deviation in the display of the measured electronic input to a mechanical actuator. In a titration system, pulses are applied to a stepping motor which adds a precise volume of titrant to the mixture to be titrated. A measurement of the number of pulses is an indication of the volume added but this measurement must be corrected for variations in the strength of the titrant and/or for mechanical deviation in the delivery system. An automatic calibration system produces output pulses related in number by a specified calibrating ratio to the number of pulses applied to the stepping motor. This calibrating ratio is automatically set into the system during a calibrate mode using a standard titrant.

4 Claims, 7 Drawing Figures

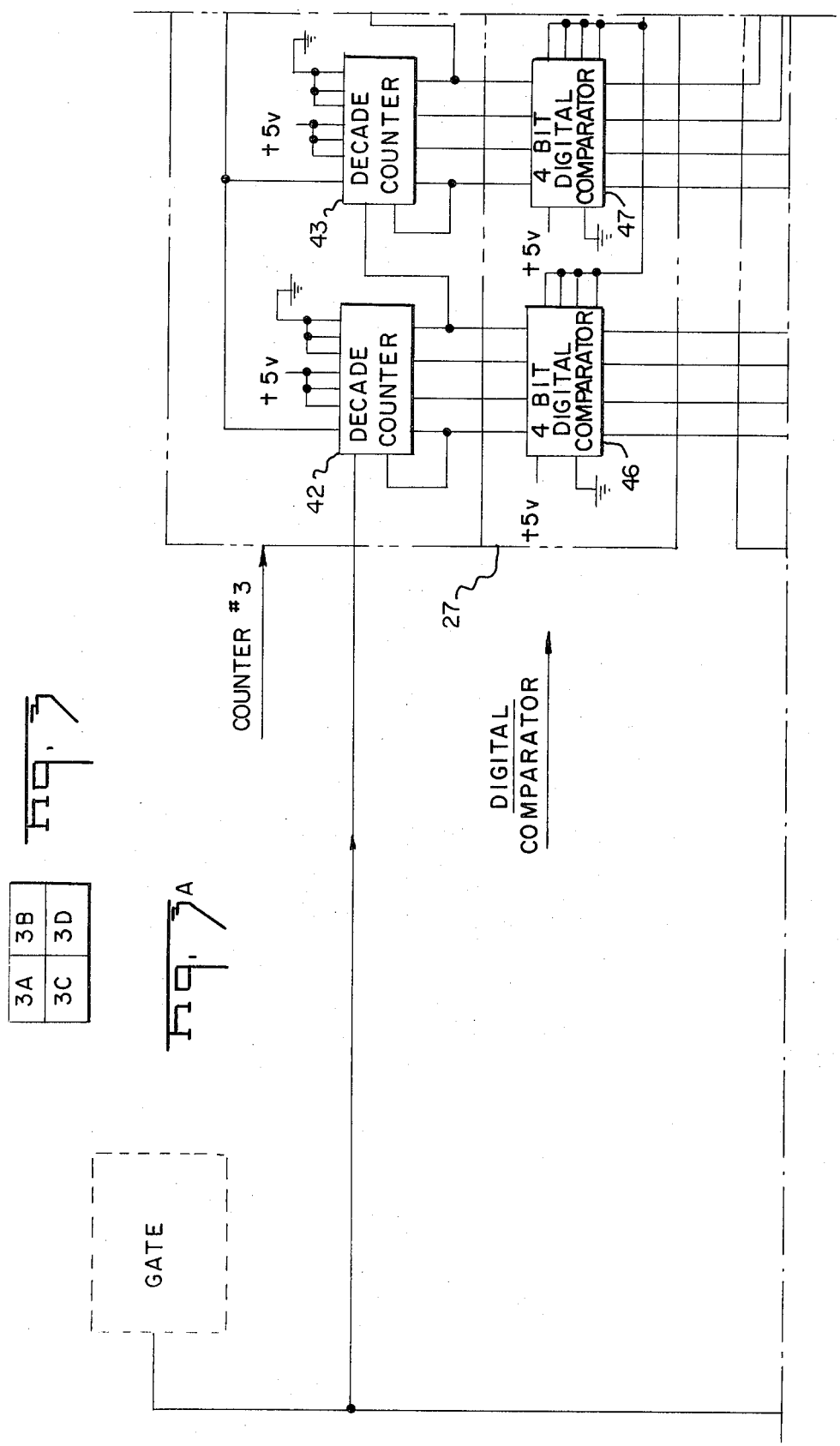

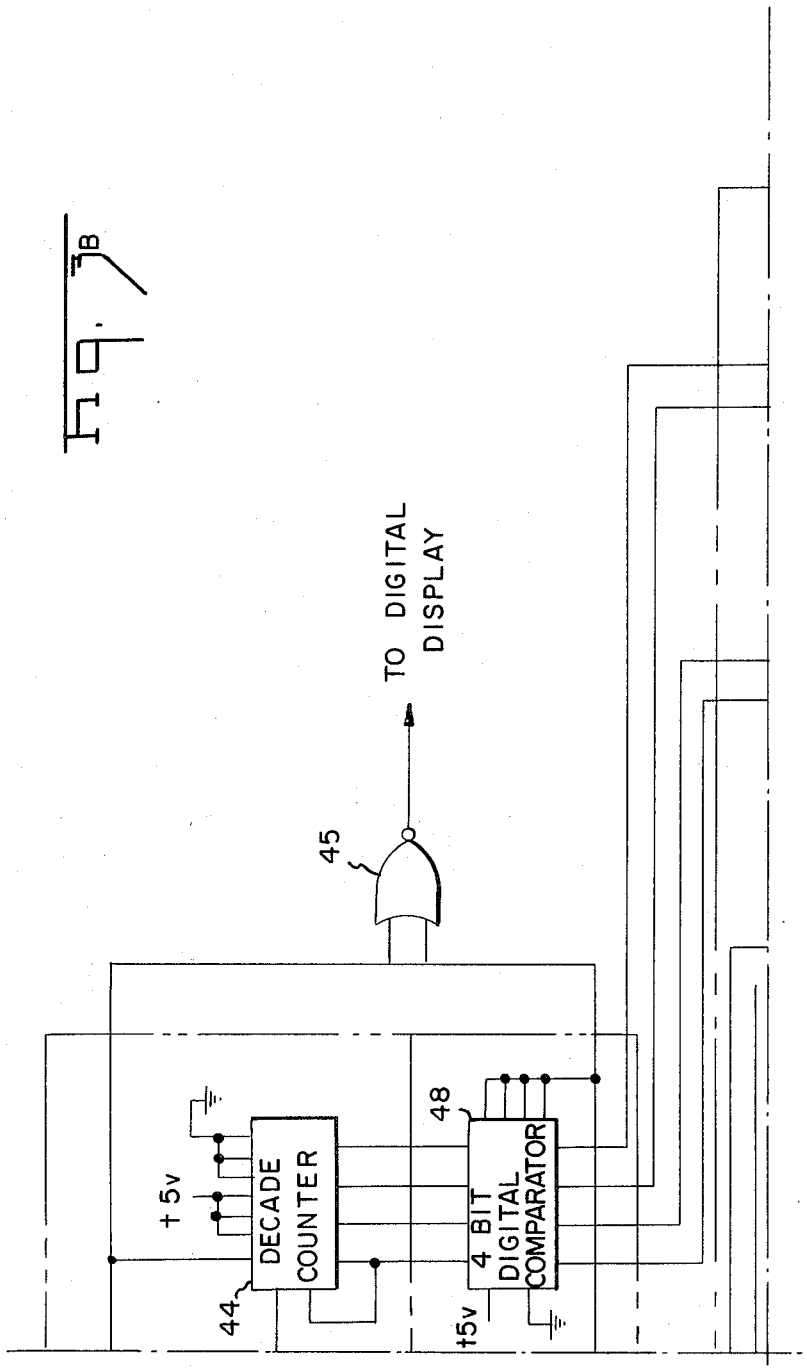

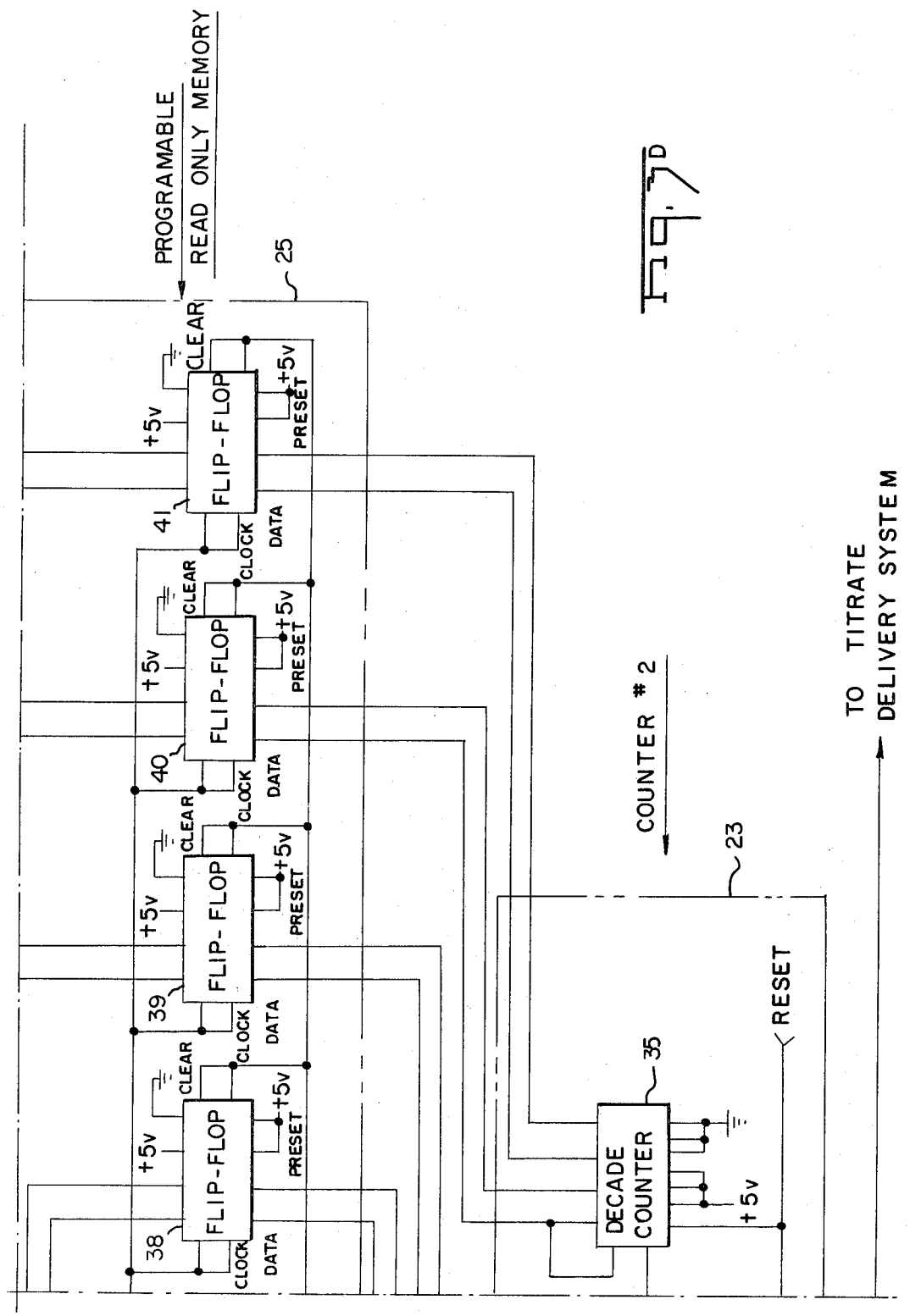

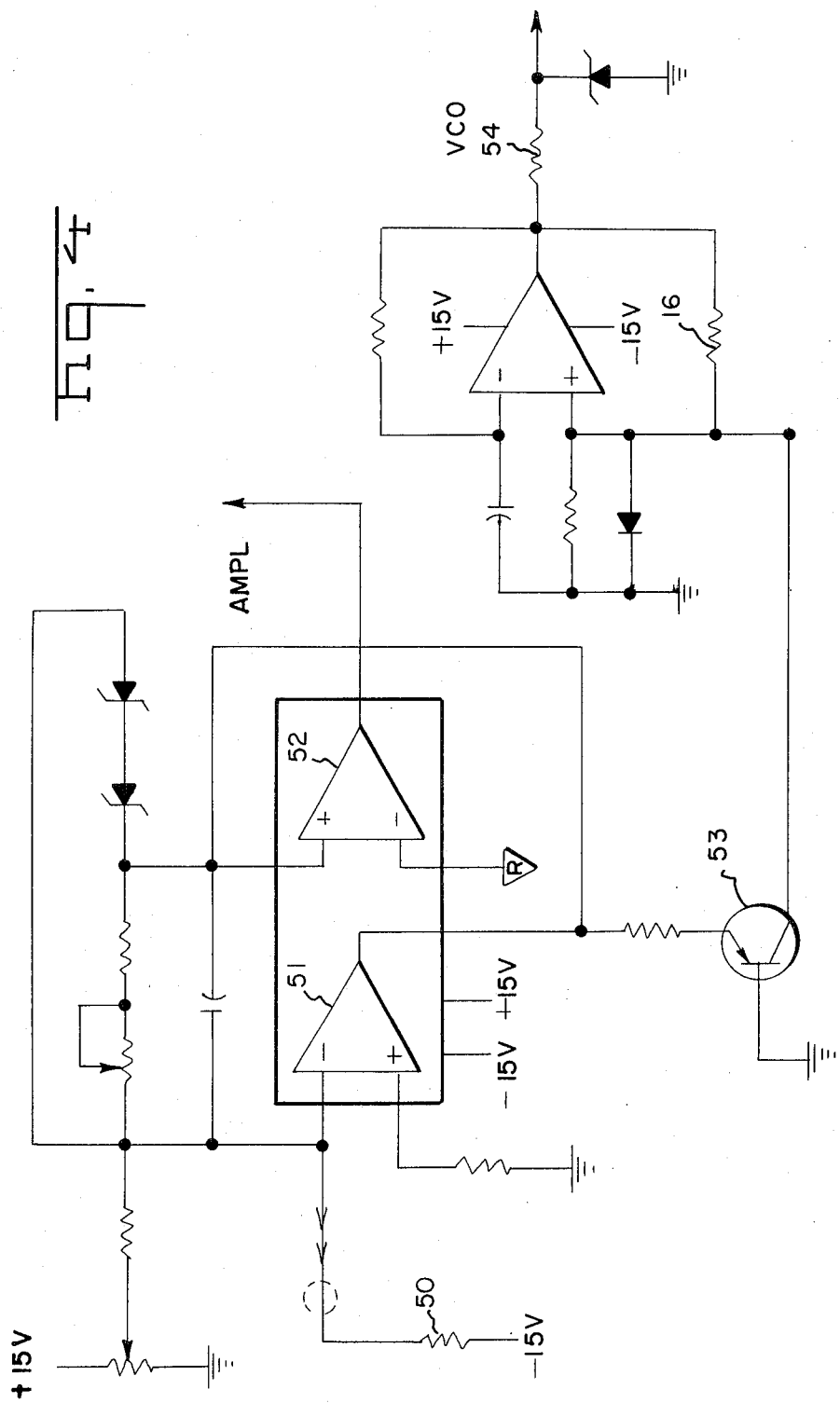

ELECTRONIC CALIBRATION OF AN ELECTRO-MECHANICAL SYSTEM

BACKGROUND OF THE INVENTION

This invention relates to electronic calibration systems and more particularly to an automatic calibration system for titration.

Titration measures the concentration of strength of a solution in terms of the amount of reagent of known concentration required to bring about a given effect in reaction with a known volume of the test solution. A typical titration system includes a motor driven burette or syringe which adds precise volumes of titrant to the mixture to be titrated. The titrant drives the mixture to some recognizable endpoint. Among the endpoint detectors which can be used are those which detect the following characteristics: fluorometric, potentiometric, amperometric, colorometric and thermal. When the endpoint is reached the volume of the titrant is read from an indicator that is synchronized to the motor drive. This indicator reading is scaled mathematically to yield data in volumetric terms. Typically, the output may be in milliequivalents (mEq), in grams per 100 ml (gms%), or in parts per million (ppm). One of the problems in such systems is that the titrant strength may vary. In order to maintain accuracy the strength of the titrant is determined daily by injecting a known controlled standard into the system. The standard is titrated and the reading is taken from the indicator. The proper scaling value is determined and this is used for a time determined by the confidence in the stability of this number. As an example, titrating a 5.00 mEq of calcium, the indicator reads 5.35 instead of 5.00. The scaling number is $(5.00/5.35) = 0.935$. All subsequent titrations when read off the indicator must now be multiplied by this constant. Alternatively, the titrant strength can be increased by the ratio of $(5.35/5.00) = 1.07$.

A titration system similar to that described above is described in "Evaluation of an Automatic Calcium Titrator," Roy L. Alexander, Jr., CLINICAL CHEMISTRY, vol. 17, number 12, 1971, page 1,171. The titrator described in this article is the Fiske/Marius calcium titrator supplied by Fiske Associates Inc., Usbridge, Mass., 10569. The calibration procedure for this system is described more particularly in the instruction manual supplied by that company.

SUMMARY OF THE INVENTION

In accordance with this invention automatic electronic calibration is obtained by a system which produces output pulses related in number by a specified calibrating ratio to the number of pulses which specify the physical quantity, or dimension, to be calibrated.

In a titration system clock pulses are applied to a delivery system which delivers a precise quantity of titrant for each pulse. The automatic calibration system of this invention produces output pulses related in number by a specified calibrating ratio to the number of pulses applied to the delivery system. The output pulses are applied to a digital display which indicates the amount of titrant added. This invention calibrates the displayed output to compensate for variations in titrant strength and for slippage in the electromechanical delivery system. Also, by selection of the proper calibrating ratio, it is possible to display the output in any desired format, for example in terms of millequivalents, grams per ml or in parts per million.

In accordance with another important aspect of this invention the calibrating ratio is automatically determined by using a standard calibrating mixture. The actual number of aliquots of titrant required to titrate the standard calibrating mixture are stored during a calibrate mode. As used herein, aliquot means a volume of liquid dispensed by the stepper motor. During subsequent sample analysis, the number of pulses supplied to the delivery system is factored by the ratio of the nominal number of aliquots required to titrate the standard mixture divided by the stored actual number of aliquots required.

The foregoing and other objects, features and advantages of this invention will be better understood from the following more detailed description and appended claims.

DESCRIPTION OF THE DRAWINGS

FIGS. 3A—3D together form a schematic diagram of the automatic calibration system; and FIG. 4 is a schematic drawing of the sensor, amplifier, endpoint detector and pulse oscillator.

DESCRIPTION OF A PARTICULAR EMBODIMENT

Figure 1:
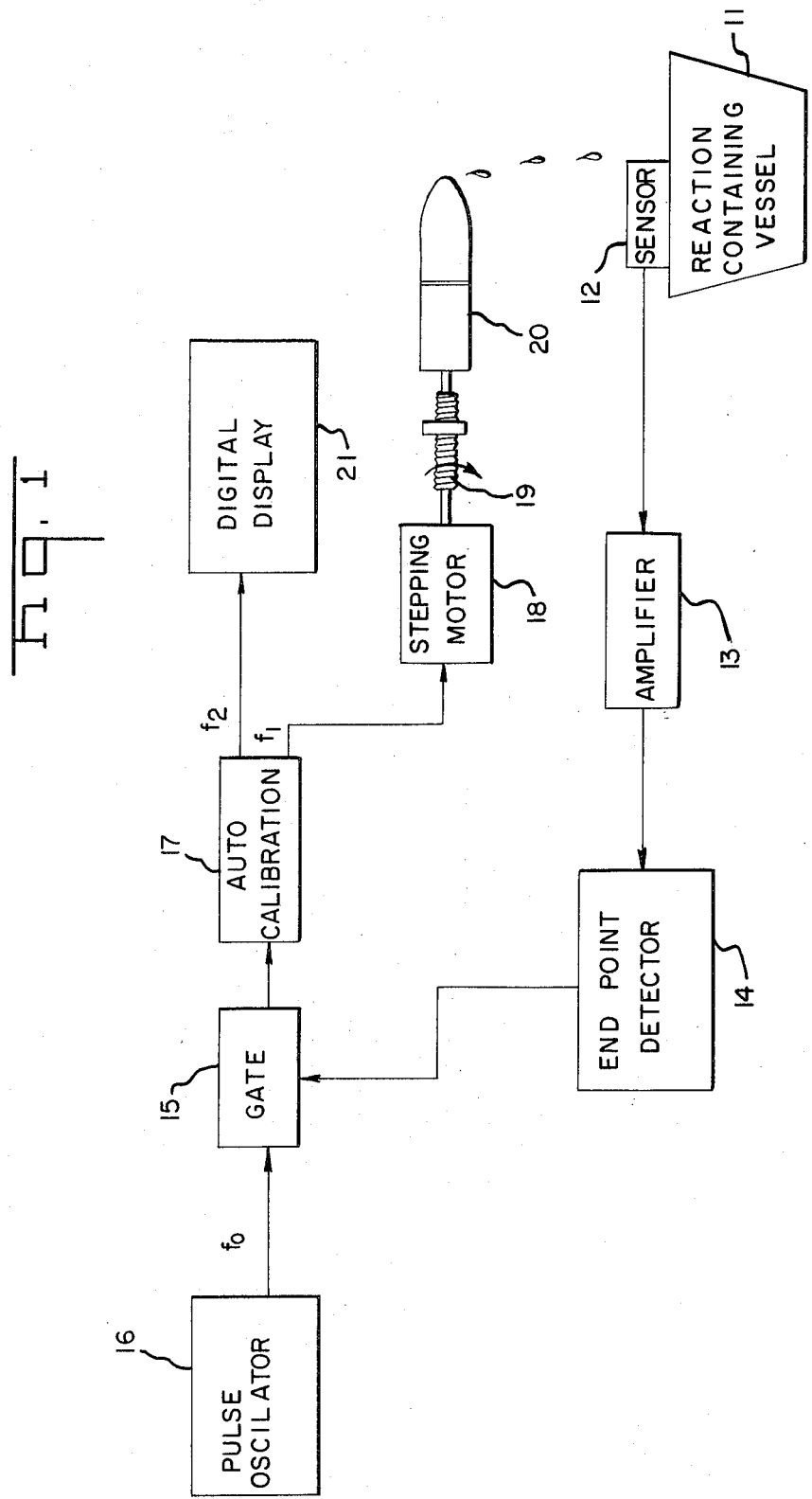
FIG. 1 shows a titration system.

The invention will be described with reference to the titration system shown in the drawing. It will be understood that this invention has other applications.

In FIG. 1 the reaction containing vessel 11 is a cuvette, test tube or tank. It contains the mixture to be titrated. A sensor 12 senses the physical parameter of interest such as pH, fluorescense, color, temperature and so on. The sensor generates an electrical signal that is a measure of the parameter of interest. This electrical signal is amplified and filtered in the amplifier 13. The signal level is compared to an endpoint level in the endpoint detector 14. This controls the opening and closing of the gate 15. The gate 15 allows pulses from the oscillator 16 to be applied to the automatic calibration system 17 until the endpoint is detected. Then the gate 15 is closed and no more pulses are delivered to the automatic calibration system 17.

In accordance with this invention the automatic calibration system 17 produces two pulse trains of different frequencies $f_1$ and $f_2$. The pulse train having a frequency $f_1$ is applied to a titrant delivery system. This includes a stepping motor 18 which is driven a very specific angular rotation for each pulse applied thereto. This angular rotation is converted to linear motion by a lead screw 19. The lead screw 19 pushes a plunger in the syringe 20. The syringe 20 dispenses a very specific volume of titrant for each pulse. The number of pulses in the pulse train applied to the stepping motor is changed by a calibrating ratio to produce the pulse train having the frequency $f_2$. The pulse train having a frequency $f_2$ is applied to the digital display 21. The calibration system 17 scales the pulses so that the digital display reads out in the volumetric quantities desired by the operator such as mEq, gms. %, or ppm. The calibration system also scales the pulses by a factor which compensates for variations in the titrant strength and for slippage in the electro-mechanical delivery system.

Figure 2:
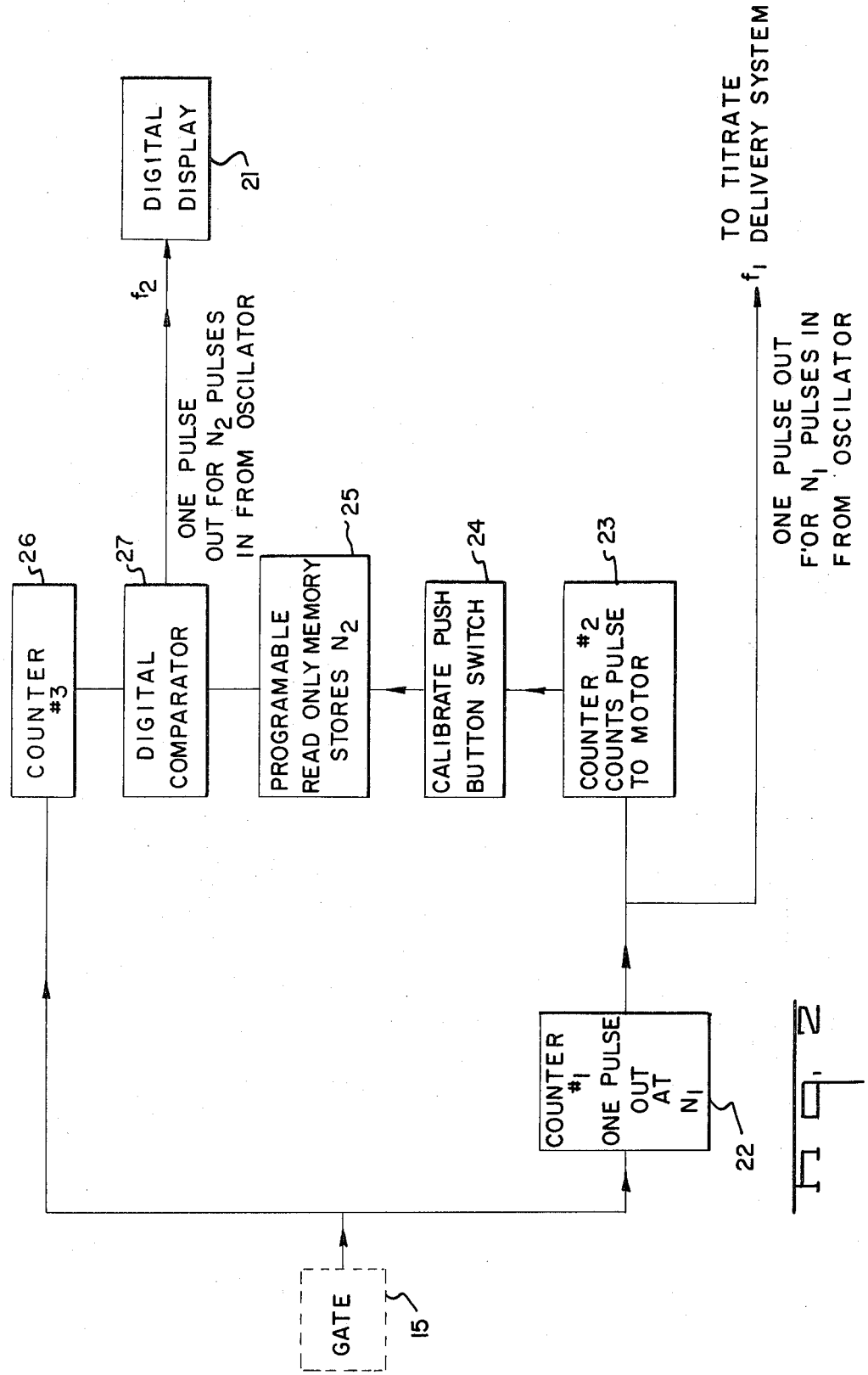
FIG. 2 is a block diagram of the automatic calibration system of this invention.
Figure 7C:
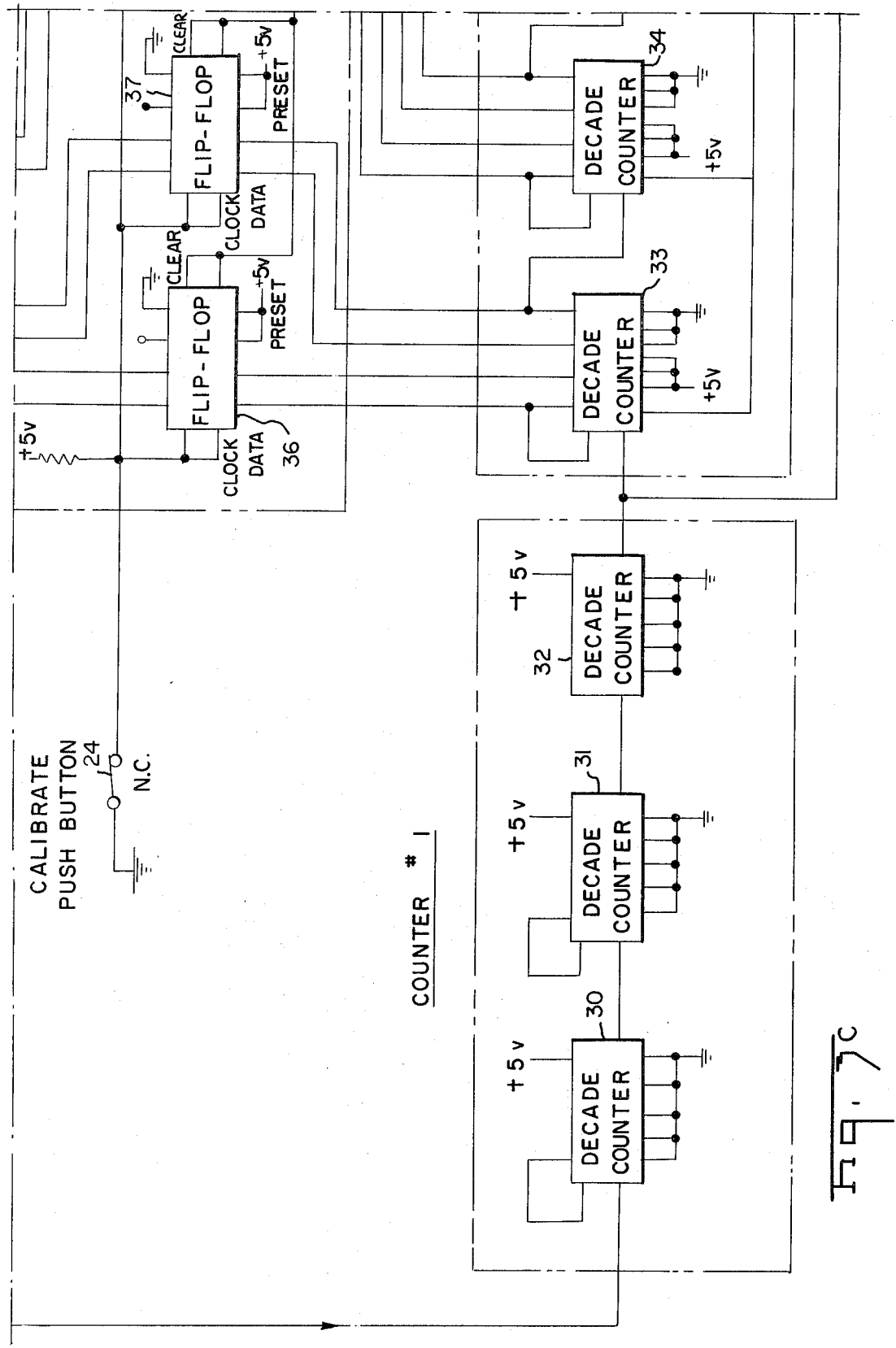

FIG. 2 shows the automatic calibration system 17 in more detail. The output of gate 15 is a gated pulse train having a number of pulses proportional to the time between the beginning of titration and the detection of the endpoint. Counter 22 divides this pulse train by a number $N_1$ proportional to the nominal volume (aliquots) required to titrate the standard solution. The output of counter 22 is a first digital signal which is applied to the delivery system.

During a calibrate mode of operation the actual number of pulses required to titrate a standard solution is counted in the counter 23. This number is related to the actual number of aliquots required to titrate the standard mixture and this actual number is stored by actuating calibrate switch 24. This transfers the actual number from counter 23 to the programmable read only memory 25.

During subsequent titration operations the gated pulse train from the gate 15 is counted in counter 26. Each time the count in counter 26 equals the stored actual number the digital comparator 27 produces an output pulse. This procudes a second digital signal having a pulse frequency of $f_2$. This is applied to the digital display 21.

OPERATION OF THE SYSTEM

The operation of the system is as follows. First, consider the calibrate mode. During this mode a standard solution is placed in the reaction containing vessel 11. For example, the standard solution may nominally require 500 aliquots of titrant to bring it to the endpoint. The counter 22 is set to divide the gated pulse train by the nominal value of 500. During the calibrate mode the counter 23 counts the actual number of pulses required to titrate the standard solution. As an example, assume that when the endpoint is reached, and gate 15 is turned off, the counter 23 has counted 535 pulses. The calibrate switch 24 is actuated and this actual number, designated $N_2$, is transferred to the read only memory 25. The instrument is now calibrated and is ready to be operated.

During an operating mode an unknown sample is placed in the vessel 11. When titration is begun, the gate 15 is opened and pulses are delivered to the stepping motor 18. These pulses are at the frequency of the oscillator 16 divided by the nominal value of $N_1 = 500$, the value to which the counter 22 has been set. For every 535 pulses in the gated pulse train, the digital comparator 27 produces one output pulse in the train with the frequency of $f_2$. That is, $f_2 = (f_0/535)$ where $f_0$ is the frequency of the pulse oscillator 16. Similarly, the frequency of the pulses applied to the delivery system is given by: $f_1 = (f_0/500)$. The calibrating ratio is $(f_2/f_1) = (500/535)$. This is precisely the ratio required to provide a true output in the digital display 21.

Assume that the concentration of the unknown sample is exactly twice the concentration of the standard. Then the digital display 21 will read 1,000 aliquots. This is correct since it is exactly twice the nominal concentration of the unknown of 500.

THEORY OF OPERATION

The number of pulses that reach the stepping motor 18 during the calibration mode is $N_2$. This actual number is stored in counter 23 and is transferred to the read only memory 25.

During the normal mode the pulses that reach the stepping motor come at time intervals:

$$(1)\ t_1 = (N_1/f_0) = (1/f_1)$$

The pulses that reach the digital display 21 have time intervals of:

$$(2)\ t_2 = (1/f_2) = (N_2/f_0)$$

The unknown sample to be titrated will receive a number of aliquots of titrant equal to:

$$(3)\ N_3 = (T_3/t_1) = T_3\ (f_0/N_1)$$

$N_3$ is equal to the number of pulses applied to the stepping motor. $T_3$ is the time required to complete the titration. During this time the digital display has been receiving pulses and now displays a number equal to the number of pulses it receives. The number displayed is:

$$(4)\ N_4 = (T_3/t_2) = T_3\ (f_0/N_2)$$

Solving for $T_3$ from equation (3)

$$(5)\ T_3 = N_3\ (N_1/f_0)$$

If we substitute this $T_3$ into Equation (4) we have $$(6)\ N_4 = [N_3\ (N_1/f_0)]\ (f_0/N_2) = (N_3\ N_1/N_2)$$

The number of aliquots necessary to titrate any sample is directly proportional to the concentration. Hence, $N_2$ is directly proportional to the standard concentration of the standard. $(7)\ N_2 = k\ C_s$ where $C_s =$ concentration of the standard.

By the same reasoning $N_3$ is directly proportional to the concentration of the unknown.

$$(8)\ N_3 = k\ C_x$$

Substituting (7) and (8) into (6)

$$N_4 = (k\ C_x/k\ C_s)\ N_1$$

$$(9)\ N_4 = (C_x/C_s)\ N_1$$

This is the desired equation for the calibrating system. $N_1$ is the nominal value. It is chosen so that $N_4$ reads directly in standard chemistry units. To use real numbers now, assume that $C_x$ is a standard and $N_1$ is chosen so that $N_4$ the standard reads 500 mEq when the standard is titrated.

Therefore, let $C_x = C_s$ and $N_4 = (C_s/C_s)\ N_1$. For this example $N_1$ is 500, (9) now becomes $$(10)\ N_4 = (C_x/C_s)\ 500$$

If the next sample is twice the concentration of the standard, then the digital display will read $$N_4 = (2\ C_s/C_s)\ 500 = 1,000\ \text{which is correct.}$$

In fact, from equation (10) it is shown that the digital readout is a linear function of the unknown and is properly scaled and calibrated.

THE SCHEMATIC DIAGRAM OF THE AUTOMATIC CALIBRATION SYSTEM

As shown in FIG. 3 the counter 22 includes decade counters 30, 31 and 32 which are interconnected to supply one pulse to the stepping motor for every 500 input pulses. It will be appreciated that the connections of these counters can be changed so that counter 22 will divide by any given nominal number.

The titration pulses are also applied to the counter 23 which includes the decade counters 33, 34 and 35. During a calibrate operation, when the calibrate push button 24 is opened, the count in the counter 23 will be transferred to programmable read only memory 25. This read only memory includes the flip flop stages 36–41.

During a normal titration operation the gated pulse train is also applied to the counter 26 which includes the decade counters 42–44. When the count in the counter 26 reaches the stored actual value in memory 25, the digital comparator 27 produces a pulse output through the gate 45. The digital comparator 27 includes three four bit digital comparators 46, 47 and 48.

While the present invention can be implemented with various circuit techniques, the following components supplied by Signetics Corporation, Sunnyville, California, have been found to be suitable for use;

Decade counters 30–35 and 42–44 are type N7490A decade counters;

Flip flops 36–41 are type N7474A dual D-type edge-triggered flip flops; and

Four bit digital comparators 46–48 are type N8242A four bit digital comparators (quad exclusive- nor).

FIG. 4 shows the sensor 12, amplifier, endpoint detector and pulse oscillator. The sensor in this case is a colormetric detector which includes the photo resistor 50. The operational amplifiers 51 and 52 serve both functions of amplification and endpoint detection. At the beginning of the titration, amplifier 51 acts through transistor 53 to turn on the pulse oscillator 16. This supplies clock pulses through resistor 54 to the gate.

When the input to the amplifier 52 goes to zero, the output of amplifier 52, which is applied to the gate, turns the gate off. This terminates the gated pulse train.

MODIFICATIONS OF THE INVENTION

In digital electro-mechanical or electro-optical systems, physical quantities such as position, velocity, volume, etc., are sometimes measured indirectly by measuring the electronic input to the mechanical actuators. As an example, digital pulses are used to control milling machines.

Since it is possible to measure electronic inputs to a much higher accuracy than it is possible to produce mechanical movement, it is possible to automatically correct for mechanical deviation in the display in the measured electronic input. In general the technique of this invention is applicable to any system wherein it is desired to convert a digital signal representing one dimension, for example the digital signal applied to the milling machine, to a second digital signal which has been modified by a calibration ratio. In most instances it will be desired to display this second digital signal.

While a particular embodiment has been shown and described, the appended claims are intended to cover any modifications within the true spirit and scope of the invention.

What is claimed is:

1. In an electromechanical system including an actuator which moves to produce precise increments of change in a physical quantity in response to applied pulses, a detector for indicating when a given change in said physical quantity has been reached, and an indicator of the movement of said actuator required to reach said given physical change, the improvement of an automatic calibration system comprising:
   a source of clock pulses,
   a gate, said clock pulses being applied to said gate, said gate being opened at the beginning of movement of said actuator and closed in response to an output from said detector,
   means for applying said gated pulses to said actuator to move said actuator in said precise increments,
   a pulse ratio circuit, said gated pulses being applied to said pulse ratio circuit, said pulse ratio circuit producing output pulses related in number by a specified calibrating ratio to the number of input pulses, and
   a digital display, the output pulses from said ratio circuit being applied to said digital display so that said display indicates the amount of movement of said actuator factored by said calibrating ratio.

2. In a titration system including means for delivering precise volumes of titrant to the mixture to be titrated, an endpoint detector for indicating when a given effect in reaction has been reached in the titrated mixture, and an indicator of the volume of titrant required to reach said given effect, the improvement of an automatic calibration system comprising:
   a source of clock pulses,
   a gate, said clock pulses being applied to said gate, said gate being opened at the beginning of titration and closed in response to an output from said endpoint detector,
   means responsive to the gated pulses for delivering one of said precise volumes of titrant to said mixture,
   a pulse ratio circuit, said gated pulses being applied to said pulse ratio circuit, said pulse ratio circuit producing output pulses related in number by a specified calibrating ratio to the number of input pulses, and
   a digital display, the output pulses from said ratio circuit being applied to said digital display so that said display indicates the precise volume of titrant added to said mixture factored by said calibrating ratio.

3. The system recited in claim 2 wherein said system is operated in a calibrate mode and an analysis mode, a standard calibrating mixture being provided as the mixture to be titrated during said calibration mode, said system further comprising:
   means for counting the actual number of aliquots required to titrate said standard calibrating mixture, and
   means for storing said actual number, the specified ratio in said pulse ratio circuit being the nominal number of aliquots required to titrate said standard calibrating mixture divided by said actual number.

4. The system recited in claimed 3 wherein said pulse ratio circuit includes a first counter, said gated pulses being applied to said first counter, said first counter producing titrating pulses at a count related to said expected number of aliquots, said titrating pulses being applied to said means for delivering a precise volume of titrant to said mixture, said means for storing said actual number of aliquots including a second counter connected to count said titrating pulses, a third counter, said gated pulses being applied to said third counter, and a digital comparator, the outputs of said third counter and said means for storing said actual number being applied to said digital comparator, said digital comparator producing one of said output pulses each time the count in said third counter reaches said actual number.

* * * * *